June 29, 1965 G. E. JENKINS 3,192,404

ANTI-SATURATION CIRCUIT FOR READ AMPLIFIER SHAPER

Filed Nov. 8, 1961

INVENTOR.
GLENN E. JENKINS
BY
Meyers & Peterson
ATTORNEYS

United States Patent Office 3,192,404
Patented June 29, 1965

3,192,404

ANTI-SATURATION CIRCUIT FOR READ AMPLIFIER SHAPER

Glenn E. Jenkins, St. Paul, Minn., assignor to Sperry Rand Corporation, New York, N.Y., a corporation of Delaware Filed Nov. 8, 1961, Ser. No. 151,047
4 Claims. (Cl. 307—88.5)

Figures 1, 2:
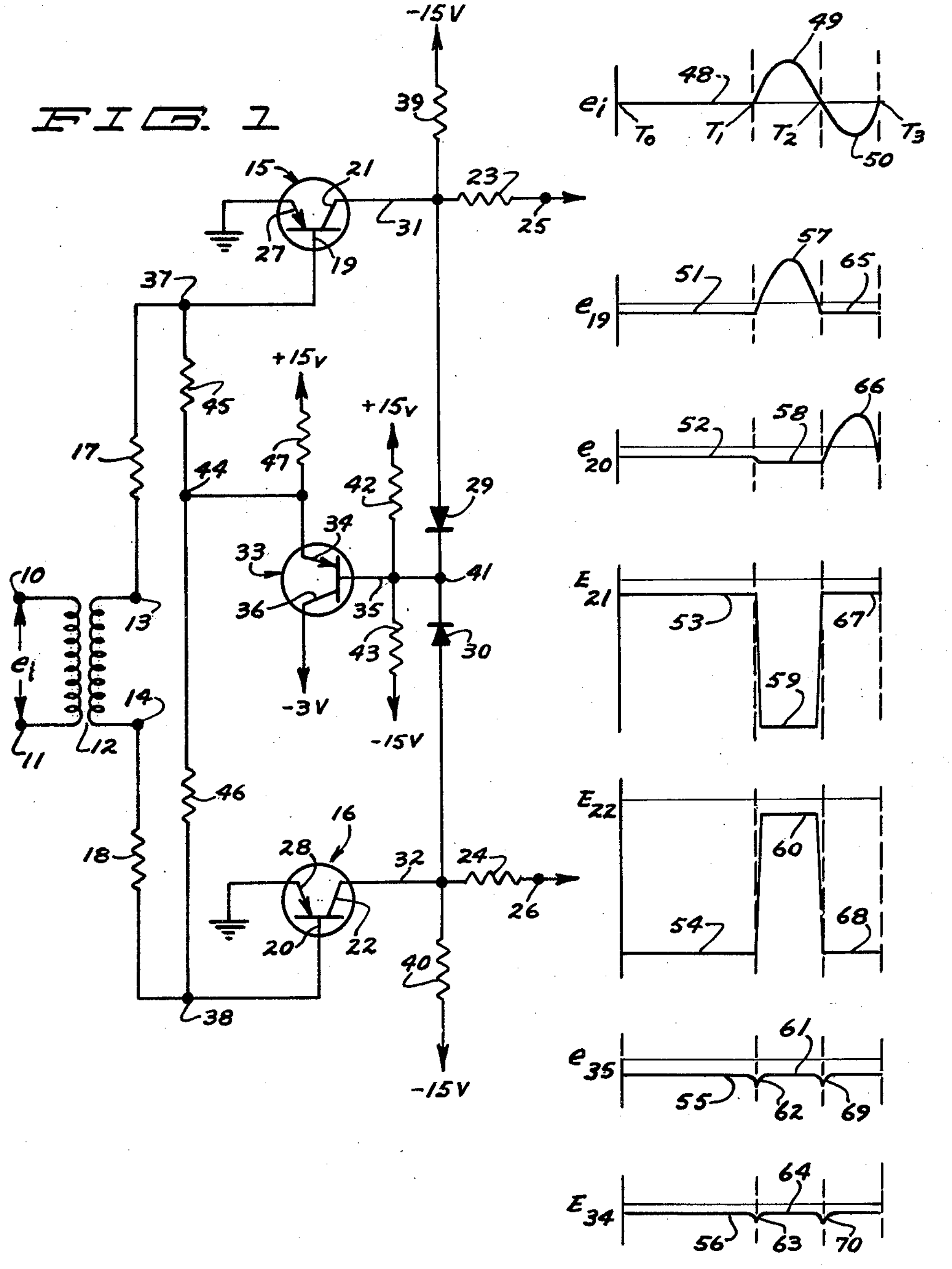

This invention relates to a transistorized electronic signal amplifier and shaper and more particularly to an improved circuit which prevents saturation of the output pulse transistors.

Computers are provided with some means of storing digital information in a readily available form, such as punched cards, magnetic tape, high speed magnetic drums and the like. In the utilization of magnetically stored information, it is necessary to convert the magnetic signals to amplified pulses. It is also necessary to properly shape the amplified pulse preparatory to transferring the information on to the computation section of the computer.

In the past, the amplification and shaping of the signals, taken from a magnetic drum for example, have been adequately accomplished but with certain limitations and drawbacks, especially when fast switching speeds of the information signal are encountered. Since the transistors commonly utilized in ordinary computer circuitry are relatively low signal devices, and their circuits are accordingly designed to act upon low level signals, it is not unusual to encounter particular situations where the output voltage of one circuit has sufficient voltage swing from no signal to a signal such that the transistors of the circuit receiving the output are driven into saturation. Operation of the transistor in the saturated region causes impaired time response to fast signal operation since the residual charge remaining on the base electrode must be overcome before conduction is interrupted. In attempts to reduce the magnitude of peak input signal to amplifier-shaper circuits, diodes have sometimes been utilized. Again, however, the residual charge remaining on the diode electrodes hinders the response of the diodes to high speed voltage changes in much the same manner as transistors are affected.

It is therefore a general object of this invention to provide an amplifier-shaper circuit which is provided with a means by which the input voltage may be utilized at full values without driving output transistors into the saturation region, thus allowing higher speed operation.

More particularly, it is an object of this invention to provide an improved amplifier-shaper circuit which will receive and properly function on a wide range of input voltage levels without variation in the output pulse.

Another object of this invention is to provide a transistorized amplifier-shaper circuit as set forth above which utilizes particular components and circuit designs to allow the conduction of one transistor to aid in cutting off previous conduction of another transistor thereby allowing more positive and reliable operation of the circuit in addition to faster response to high speed switching of the input signal.

A further object of this invention is to provide an amplifier shaper circuit as above which incorporates a minimum of components, thereby providing circuit economy as well as increased reliability.

A still further object of this invention is to provide an amplifier-shaper circuit which is simple in design as well as structure.

These and other objects and advantages of the invention will more fully appear from the following description, made in connection with the accompanying drawing, wherein like reference characters refer to the same or similar parts throughout the several views and in which:

FIGURE 1 is a schematic circuit diagram of the anti-saturation amplifier-shaper circuit; and FIGURE 2 is a graph illustrating waveforms taken at various points throughout the circuit of FIGURE 1.

A transistor anti-saturation circuit, in accordance with the present invention, receives input signals which, as indicated above, may be the signals from a magnetic tape or magnetic drum read head. The signal is coupled through a transformer, the secondary signal of which causes increased forward base to emitter bias of one of two transistors and decreased forward base to emitter bias of the other transistor. When an unbalance biasing occurs between transistors, the collector output of one will increase as the other decreases, according to the respective forward base to emitter biases.

A feature of the invention enters into importance at this point. When the collector output of one of the transistors increases, a system which may well be considered as a feedback system causes an increased output of the output transistor, above a predetermined level, to be fed back to a third control transistor. The control transistor emitter output in turn counteracts any tendency for input base to emitter bias of the output transistors to increase beyond a predetermined level whereby to prevent the collector current magnitude from further increasing. Reduction of the forward bias will thus reduce the current flow through the output transistor whereby saturation is avoided.

With the basic theory of operation now in mind, specific reference will be made to FIGURES 1 and 2 for detailed analysis of the circuit operation.

The signal, typically received from a magnetic drum read head, is transmitted to input terminals 10 and 11 of an input signal transmitting means such as input transformer 12. Input transformer 12 is merely a one-to-one ratio transformer which prevents direct current bias of the amplifier-shaper circuit from being fed back into the read head circuits. A pair of output terminals 13 and 14 on the secondary of the transformer are connected respectively to a pair of output transistors 15 and 16, through equal value current control resistors 17 and 18, at the bases 19 and 20 respectively. Each of the output transistor 15 and 16 independently feeds its output signals from collectors 21 and 22 through current limiting resistors 23 and 24 respectively and then to output terminals 25 and 26. The emitters 27 and 28 are both connected to ground.

Forming a part of a feedback network are a pair of feedback diodes 29 and 30 which connect the output lines 31 and 32 to a control transistor 33. Control transistor 33 has emitter, base, and collector electrodes numbered 34, 35, and 36 respectively in similarity to transistors 15 and 16.

The transistors 15, 16, and 33 are indicated as PNP transistors; however, the precise circuit operation does not depend on this type of transistor. They may also be of the NPN type with appropriate supply voltages.

As noted from FIGURE 1, the output transistors 15 and 16 are both electrically connected to the control transistor 33 and input transformer 12 in similar fashion. Bases 19 and 20 of output transistors 15 and 16 respectively are connected to tie points 37 and 38. Both collectors 21 and 22 are tied respectively to transistor output lines 31 and 32. Both collectors are also connected to a −15 volt collector bias voltage through dropping resistors 39 and 40. The bias voltages not only supply negative bias to the collectors, but in this particular instance are also of substantially the same magnitude that the output pulse will attain, as will become apparent subsequently.

The feedback diodes 29 and 30 are serially connected between the transistor output lines 31 and 32 in such a manner that current flow will be allowed in the direction from the transistor output lines to the common terminals or junction 41 of the diodes 29 and 30. Junction 41 is in turn tied to the base 35 of control transistor 33 which is biased to a negative potential through voltage divider resistors 42 and 43. The voltage divider resistors are serially connected between sufficiently positive and negative potentials that the base will be substantially at the value of a slightly negative potential, say, 2.5 volts. The emitter 34 of control transistor 33 is tied to a junction 44 between a pair of equal valued voltage divider resistors 45 and 46. The opposite ends of the resistors 45 and 46 are connected, as seen, to tie points 37 and 38. Connected to the emitter 34 is a positive bias voltage separated by a dropping resistor 47, and connected to the collector 36 is a negative bias voltage.

Referring now to the graphs of FIGURE 2, the operation of the circuit will be set forth.

Before further explanation is made of the circuit, however, it is pointed out that each of the curves represented in FIGURE 2 has voltage level or magnitude as the ordinate and time as the abscissa. Each of the voltage curves is identified by $e$ or E for input and output voltages respectively with a sub-number denoting the particular point of the circuit where the voltage is taken. For example, $E_{21}$ denotes the output voltage at point 21 of the circuit, or at the collector of output transistor 15. It is also pointed out that the various voltage levels referred to in the description of FIGURE 2 are merely operating levels which have been found to be satisfactory for operation of the circuit and may be established with various bias voltage and dropping resistors of preselected values which will achieve the working voltages used.

The curves of FIGURE 2 indicate various voltages throughout the shaper circuit during the time of zero signal input from $T_0$ to $T_1$, and then during the time of input signal from $T_1$ to $T_3$. It is understood that in the actual use and operation of this circuit in a computer, the time lapse from $T_0$ to $T_1$ would be of little or no significance since the only voltage actually viewed is that during the time $T_1$ to $T_3$. This time duration is dictated by a clock pulse which is provided by the central timing system of the computer.

As shown on graph 48, which represents the input voltage to the input transformer 12, the voltage from $T_1$ to $T_3$ constitutes a waveform substantially similar to a sinusoidal wave and, in this representation, has a positive going portion 49 followed by a negative going portion 50. This particular signal arrangement may be typical of one of two states of information, for example, a 1 or a 0. The other of the two states is represented by a negative going wave portion followed by a positive going wave portion. In other words, the other of two conditions would be represented by a waveform 180° out of phase with that shown by curve 48. This theory will be readily recognized and understood by those skilled in the art.

From time $T_0$ to $T_1$, in which there is no input voltage at input terminals 10 and 11 of transformer 12, the emitter of control transistor 33 causes a negative .3 volt to be applied at the bases 19 and 20 of output transistors 15 and 16 as shown by curves 51 and 52. Since the two transistors 15 and 16 are electrically connected to the circuit in identical manner, the transistor which turns on will be that which has the better conduction parameters. Assuming for the sake of example that output transistor 15 has the better parameters, then the negative .3 volt on its base will cause conduction from its emitter 27 through collector 21 and through output line 31. The current flow then will cause feedback current to flow through diode 29, junction 41 and into the base of control transistor 33. With transistor 15 in the conductive state, the collector 21 will be at a potential of substantially negative .4 volt as shown by curve 53, and with a small voltage drop across diode 29 will cause junction 41 (and control transistor base 35) to stabilize at a negative .7 volt. With transistor 16 in the non-conductive state, the collector voltage at output line 32 will be substantially that of the bias voltage connected to resistor 40, as seen by curve 54, which may be a value of —15 volts. This is true since there is no current flow through the resistor 40 and this bias voltage will thus appear at output line 32. Since the base 35 of control transistor 33 is stabilized at a negative .7 volt (as seen by curve 55) by the collector current of transistor 15 as well as current flow through the voltage divider network of resistors 42 and 43, the control transistor will be in a conductive state at $T_0$ to $T_1$. The emitter voltage of the control transistor will likewise be of a negative potential but at substantially a .3 volt higher level than the base or at a value of negative .4 volt as shown by curve 56. This is true since the control transistor 33 is connected as an emitter follower which means the emitter voltage will follow the voltage of the base input but at a slightly higher voltage, the difference of which is equal to the voltage drop from base to emitter.

Assuming next that a bit of information, read from time $T_1$ to $T_3$, is recorded and the computer clock pulse is synchronized so that the time $T_1$ to $T_3$ is critical to all other circuits in the computer, then the chance operation of one or the other of output transistors 15 or 16 during the no signal period from $T_0$ to $T_1$ is eliminated and positive operation is thereby provided by the input voltage. This is shown by graph 48 from $T_1$ to $T_3$. As explained above, one bit of information would have a voltage characteristic such as that of graph 48 where the positive going portion 49 between $T_1$ and $T_2$ is followed by a negative going portion 50 from $T_2$ to $T_3$. Assume that the positive going portion 49 of curve 48 is impressed upon the input transformer 12 at a magnitude of approximately 2.0 volts, for example, such that tie points 37 and 38 become positive and negative respectively with respect to each other. In this instance, current flows from junction 37 to 38 in the closed loop which includes resistors 17 and 18 as well as output terminals 13 and 14. The base 19 of transistor 15 will then become sufficiently positive with respect to emitter 27 as shown by point 57 of curve 51 to reverse bias the transistor 15, and the base 20 of transistor 16 will become slightly more negative, as shown at point 58 of curve 52. Base 20 will go slightly more negative due in part to the magnitude of the input signal as well as due partially to the emitter output of control transistor 33 which holds junction 44 at the negative .4 volt. This biasing, caused by the polarity of the input signal, will cause the transistor 15 to become reverse biased from base to emitter and non-conductive so that the collector voltage will swing from negative .4 volt at the no signal state of curve 53 to substantially the potential of the collector bias voltage or a negative 15 volts at point 59. The negative 15 volt level is established by the collector bias voltage since no appreciable current will be flowing through dropping resistor 39. At the same time that the voltage of collector 21 swings negative, the forward base to emitter biasing of transistor 16 will allow conduction through its emitter 28 and collector 22 whereby the collector voltage will swing from the no signal level of substantially negative 15 volts to approximately negative .4 volt such as that shown at point 60 of curve 54.

With the transistors 15 and 16 in the non-conductive and conductive states respectively, current will be caused to flow from the collector of conductive transistor 16 in two directions. One direction is through output terminal 26 toward the next circuit (not shown) and the other direction is through diode 30 into the base of control transistor 33. The current to the control transistor follows the path from the grounded emitter 28 of transistor 16 to the base 35 of control transistor 33 which, as shown at point 61 of curve 55, is thus caused to stabilize at substantially a negative .7 volt in the same manner as it did with transistor 15 conducting. As collector 21 of transistor 15 is at substantially negative 15 volts, no current will flow through diode 29 since it is reverse biased by the more positive base 35 with respect to collector 21. This is desirable since it is the conducting transistor 16 which is subject to saturation caused by the magnitude of the input signal, and it is thus the conducting transistor which must regulate the degree of control which the control transistor provides to avoid saturation.

Referring to curve 55 of the control transistor base voltage, it is restated that the voltage level was established at negative .7 volt from $T_0$ to $T_1$ by the current flow through diode 29 which in turn was caused by transistor 15 being conductive. At point 61, the base is maintained at the same level voltage of negative .7 volt by the conduction of transistor 16. As now noted from curve 55, there is a negative going spike 62 of a magnitude of approximately negative 1.0 volt. Spike 62 is caused by a transition as the input voltage polarity reverses thus causing transistor 15 to cut-off and transistor 16 to turn on.

More specifically, the spike is caused by a coaction between the positive-going collector voltage of transistor 16 as it takes over the control of control transistor 33, and the negative-going collector voltage of transistor 15 as it relinquishes control to transistor 16. Since both collectors 21 and 22 are making substantially a .15 volt swing between the voltage levels of negative .4 volt and negative 15 volts, it results that the two outputs will have a crossover at a lower voltage than the steady state level of .4 volt. Because of this, spike 62 reaches a peak value of negative 1 volt or more.

Since control transistor 33 is connected as an emitter follower, it will be readily understood why the spike 63 of curve 56 will likewise appear at the emitter 34 prior to the steady state control at point 64. It is now pointed out that spike 63 causes a novel operation of the circuit to come about. When the emitter is caused to go increasingly negative due to spike 63, junction 44 will likewise go equally negative. With junction 44 at an increased negative level, tie point 38 will go additionally negative from the input signal across terminals 13 and 14, and tie point 37 will go increasingly positive. Thus, transistor 16 is caused to be conductive more quickly and transistor 15 to be cut-off or become non-conductive more quickly. The net result is a much faster response to the change in polarity of the input signal. This is caused by the transistor which is turning on, to aid the other transistor in cutting off.

With a 2 volt input signal, as assumed above, and if control transistor 33 was not utilized, terminals 13 and 14 will tend toward relative values of a plus 1 volt and minus 1 volt, respectively, and tie point 44 will then tend toward a zero potential. Consequently, tie point 37, and base 19, will have substantially a positive 1.0 volt and tie point 38, and base 20, a negative .7 volt. Parameters of the transistors 15 and 16 will, however, allow a negative .7 volt base to emitter bias to put the transistors in a saturated state. By including the control transistor 33, and what has been referred to as the feedback system, the input signal will then be tied to tie point 44, which in turn will be established at a voltage of negative .4 volt (see point 64 of curve 56) during the signal input. Depending upon the values of control resistors 17 and 18 as well as voltage divider reistors 45 and 46, the voltage values will establish tie point 37 at substantially a positive 1.6 volts (as well as base 19 of transistor 15) and tie point 38 at substantially negative .4 to .5 volt (as well as base 20 of transistor 16). Such a negative value is quite sufficient to turn the respective transistor on but not sufficient to drive it into saturation.

As set forth previously, a bit of information would be represented by a positive input voltage swing followed immediately by a negative voltage as shown in curve 48. The difference in circuit operation between the positive portion 49 and the negative portion 50 is that the terminals 13 and 14 would change polarity and thus cause reversed polarity at tie points 37 and 38. With reversed polarities at the bases 19 and 20 of transistors 15 and 16 respectively (as shown at points 65 and 66 respectively), transistor 15 would again be conductive and cause its collector 21 to swing more positive to negative .4 volt at point 67 while transistor 16 would become non-conductive and cause its collector output to swing more negative to substantially negative 15 volts at point 68. Again also, transition spikes 69 and 70 would appear at the base 35 and emitter 34 of control transistor 33 at $T_2$.

Thus, a single bit of information being received at the input to the circuit in the form of a sinusoidal wave will appear at the output terminals 25 and 26 as substantially 15 volt pulses having substantially vertical side slopes and with a duration commensurate with the positive and negative duration of the input signal. The signal has, therefore, been shaped to a square pulse and amplified from a two volt level to a fifteen volt level without allowing the transistor to enter the saturation region.

It will, of course, be understood that various changes may be made in the form, details, arrangements and proportions of the parts without departing from the scope of my invention as set forth in the appended claims.

What is claimed is:

1. An anti-saturation circuit for a read amplifier-shaper comprising, first and second transistors, coupling means adapted to connect an input signal source to said first and second transistors, a control transistor, a pair of oppositely poled unidirectional current flow elements serially connected between said first and second transistors and having their adjacent terminals joined together and connected to said control transistor whereby increased output will be fed to said control transistor, said control transistor also being connected to the first and second transistors, whereby said control transistor will control the amount of input signal each of said first and second transistors will receive.

2. An anti-saturation circuit for a read amplifier-shaper comprising, first and second transistors each including base, emitter, and collector electrodes, said emitter electrods being connected to a fixed potential, coupling means adapted to connect an input signal source to said base electrodes, a third control transistor also having base, emitter and collector electrodes, said third transistor emitter electrode being connected to the base electrodes of said first and second transistors and said third transistor collector being connected to a fixed potential, and a pair of oppositely poled diodes connected in series between the collector electrodes of said first and second transistors and having their adjacent terminals joined at the base electrode of said third transistor, said diodes having low impedance to current flow from the collector electrodes of said first and second transistors to said base electrode of said third transistor.

3. An anti-saturation circuit for a read amplifier-shaper comprising, first and second transistors each including base, emitter, and collector electrodes, a current limiting means adapted to connect an input signal with said base electrodes, a voltage divider means connected between said base electrodes, means connecting said emitter electrodes to ground, a control transistor also having base, emitter and collector electrodes, said control transistor emitter being connected to said voltage divider means and said control transistor collector electrode to an appropriate biasing voltage, and a unidirectional feedback means connecting the collector electrodes of said first and second transistors to the base electrode of said control transistor whereby current may flow toward said control transistor base electrode.

4. An anti-saturation circuit for a read amplifier-shaper comprising, first and second transistors each including base, emitter, and collector electrodes, said emitter electrodes being connected to a fixed potential and said collector electrodes being the output terminals, coupling means adapted to connect an input signal source and said base electrodes, a current limiting resistor serially connected between said coupling means and each base electrode, a pair of voltage divider resistors serially connected between said base electrodes and having a common junction, a control transistor also having base, emitter and collector electrodes, said control transistor emitter electrode being connected to said voltage divider resistors at the common junction and said collector electrode being connected to a fixed potential, a pair of diodes each having an anode and a cathode, said diodes having their respective anodes connected to the collector electrodes of said first and second transistors and having their cathodes joined at the base electrode of said control transistor, said diodes thereby having low impedance to current flow from the collector electrodes of said first and second transistors to said control transistor base electrode, and a means connected to the base electrode of said control transistor for biasing said control transistor in a forward direction.

References Cited by the Examiner

UNITED STATES PATENTS 3,046,487 7/62 Matzen et al. -------- 330—30 X

ARTHUR GAUSS, *Primary Examiner.*

JOHN W. HUCKERT, *Examiner.*